United States Patent
Kumagai et al.

(10) Patent No.: US 6,733,412 B2
(45) Date of Patent: May 11, 2004

(54) AUTOMOTIVE AUTOMATIC TRANSMISSION

(75) Inventors: Yorinori Kumagai, Saitama (JP); Tsukasa Takahashi, Saitama (JP); Tetsuo Naraki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 17 days.

(21) Appl. No.: 10/122,207

(22) Filed: Apr. 16, 2002

(65) Prior Publication Data

US 2002/0173399 A1 Nov. 21, 2002

(30) Foreign Application Priority Data

May 21, 2001 (JP) .................................... P. 2000-151287

(51) Int. Cl.[7] ............................................. F16H 37/02
(52) U.S. Cl. ........................ 475/218; 475/207; 475/208; 475/209; 192/48.91
(58) Field of Search .................................. 475/218, 258, 475/259, 207, 208, 209, 200, 206, 312; 74/339; 192/48.91, 48.4

(56) References Cited

U.S. PATENT DOCUMENTS

| | | | | |
|---|---|---|---|---|
| 4,200,006 A | * | 4/1980 | Ehrlinger et al. | 475/219 |
| 5,071,398 A | * | 12/1991 | Hotta et al. | 475/276 |
| 5,230,411 A | * | 7/1993 | Nishida et al. | 192/48.8 |
| 5,277,673 A | * | 1/1994 | Nakayama et al. | 475/278 |
| 5,310,390 A | * | 5/1994 | Shirataki | 475/312 |
| 5,971,883 A | * | 10/1999 | Klemen | 475/296 |
| 6,363,807 B1 | * | 4/2002 | Takahashi et al. | 74/336 R |
| 6,375,592 B1 | * | 4/2002 | Takahashi et al. | 475/262 |
| 6,471,615 B1 | * | 10/2002 | Naraki et al. | 475/262 |
| 6,514,173 B2 | * | 2/2003 | Suzuki | 477/124 |

FOREIGN PATENT DOCUMENTS

JP          5-67831         9/1993

* cited by examiner

Primary Examiner—Roger Pang
Assistant Examiner—David D. Le
(74) Attorney, Agent, or Firm—Armstrong, Kratz, Quintos, Hanson & Brooks, LLP

(57) ABSTRACT

An automatic transmission has: a primary transmission mechanism including: an input shaft; a planetary gear set having a sun gear, planetary gears and a ring gear, each being a helical gear, the ring gear and sun gear being respectively connected to the input shaft and to a stationary member via a one-way clutch, and a carrier for the planetary gears is connected to a primary output shaft; and an centrifugal clutch engaged/released the input shaft with/from the primary output shaft in correspondence with a centrifugal force by a weight and a thrust force by the helical gear; and a secondary transmission mechanism connected to the primary output shaft, for controlling a gear-shift into two or more speed-changed conditions. A multiplicity of change-speed gears is obtained by selectively combining the released and engaged states of the centrifugal clutch for each of the speed-changed conditions of the secondary transmission mechanism.

7 Claims, 6 Drawing Sheets

FIG. 2

| GEAR | PRIMARY TRANSMISSION M1 | SECONDARY TRANSMISSION M2 | | | FORWARD AND REVERSE SELECTOR CLUTCH |
|---|---|---|---|---|---|
| | | LOW CLUTCH | INTERMEDIATE CLUTCH | HIGH CLUTCH | |
| NEUTRAL | L | DISENGAGED | DISENGAGED | DISENGAGED | — |
| FIRST GEAR | L | APPLIED | DISENGAGED | DISENGAGED | FORWARD SIDE |
| SECOND GEAR | H | APPLIED | DISENGAGED | DISENGAGED | FORWARD SIDE |
| THIRD GEAR | L | DISENGAGED | APPLIED | DISENGAGED | FORWARD SIDE |
| FOURTH GEAR | H | DISENGAGED | APPLIED | DISENGAGED | FORWARD SIDE |
| FIFTH GEAR | L | DISENGAGED | DISENGAGED | APPLIED | FORWARD SIDE |
| SIXTH GEAR | H | DISENGAGED | DISENGAGED | APPLIED | FORWARD SIDE |
| REVERSE GEAR | L | DISENGAGED | DISENGAGED | APPLIED | REVERSE SIDE |

| GEAR SHIFTING | NUMBER OF FACTORS TO BE CONTROLLED | |
|---|---|---|
| | PRIOR ART EXAMPLE | PRESENT INVENTION |
| FIRST GEAR ↔ SECOND GEAR | 2 | 0 |
| SECOND GEAR ↔ THIRD GEAR | 4 | 2 |
| THIRD GEAR ↔ FOURTH GEAR | 2 | 0 |
| FOURTH GEAR ↔ FIFTH GEAR | 4 | 2 |
| FIFTH GEAR ↔ SIXTH GEAR | 2 | 0 |

AUTOMOTIVE AUTOMATIC TRANSMISSION

BACKGROUND OF THE INVENTION

1. Field of the Invention

The present invention relates to an automotive automatic transmission in which two transmission mechanisms are connected together.

2. Description of the Related Art

JP-B-5-67831 describes an example of such an automatic transmission.

The example is an automatic transmission wherein a primary transmission in which a plurality of gear shift conditions are changed over and a sub-transmission in which a high-speed condition and a low-speed condition are changed over are connected to each other in series, whereby a multiplicity of change-speed gears are established by combinations of respective gear shift conditions of both of the transmissions.

In shifting the gears, there is a case where the two transmissions are made to change the gears in directions opposite to each other.

For example, in order to upshift gears of the overall transmission by one gear toward a high-speed side, there occurs a case where the primary transmission is upshifted whereas the sub-transmission is downshifted. However, in the event that change-gear timings of the primary transmission and the sub-transmission overlap or deviate excessively in the opposite direction, a good drive feeling cannot be obtained.

To cope with this, the example described in the above publication includes an opposite direction gear shift detecting means, a delay-time setting means and a gear shift comment outputting means. The opposite direction gear shift detecting means detects a gear shift condition in which the two transmissions are made to shift gears in the opposite direction to each other in shifting gears. The delay-time setting means sets a delay time for delaying the gear shift of one of the two transmissions relative to the gear shift of the other based on predetermined conditions when such an opposite direction gear shift is carried out. The gear shift command outputting means outputs a gear shift execution command to one of the two transmissions, and then, outputs a gear shift execution command to the other transmission after the delay time so set has elapsed. With this construction, the deterioration of the drive feeling is prevented by delaying the gear shift of the other of the two transmissions relative to the gear shift of the one.

Thus, according to the prior art automatic transmission, the opposite direction gear shift detecting means, the delay time setting means and the gear shift command outputting means are required, and both of the main transmission and the sub-transmission have to be controlled. Consequently, the number of factors to be controlled when shifting gears is increased, and the control becomes extremely complicated, leading to high production costs.

SUMMARY OF THE INVENTION

The present invention was made in view of these situations, and an object thereof is to provide an automotive automatic transmission in which the number of factors to be controlled when shifting gears is reduced and a control system therefor can be simplified, thereby making it possible to attempt to reduce the production costs.

With a view to attaining the object, according to a first aspect of the invention, there is provided an automotive automatic transmission including a primary transmission mechanism having an input shaft connected to an engine, a planetary gear set which is constructed through mesh engagement of a sun gear, planetary gears and a ring gear which are each a helical gear, wherein one of the sun gear and the ring gear is connected to the input shaft and the other is connected to a one-way clutch via a stationary member and wherein a carrier for the planetary gears is connected to a primary output shaft, and a centrifugal clutch adapted to engage the input shaft with the primary output shaft in correspondence with a centrifugal force by a weight and to release the input shaft from the primary output shaft through a thrust force by the helical gears, and a secondary transmission mechanism connected to the primary output shaft of the primary transmission, for controlling to shift gears into two or more speed-changed conditions. The automotive automatic transmission includes a gear shift controlling unit for selectively combining a released state and an engaged state of the centrifugal clutch of the primary transmission mechanism for each of the speed-changed conditions of the secondary transmission mechanism to thereby establish a multiplicity of change-speed gears.

Because the centrifugal clutch of the primary transmission mechanism is adapted to be engaged in correspondence with the centrifugal force by the weights and to be released by virtue of the thrust force of the helical gears, the gear shift conditions by the planetary gear set can automatically be changed over.

Consequently, since the primary transmission automatically selects a gear shift condition according to the driving condition by controlling only the secondary transmission mechanism for shifting gears, the number of factors to be controlled in shifting gears can be reduced, whereby the control system can be simplified, resulting in a reduction in production costs.

According to a second aspect of the present invention, there is provided an automotive automatic transmission as set forth in the first aspect of the invention, wherein a torque converter is provided between the engine and the input shaft and wherein a neutral condition of the automatic transmission is produced by cutting off the transmission of power in the secondary transmission mechanism by the gear shift controlling unit.

The torque converter is set without any additional specific mechanism such as a clutch for accelerating from a standstill in order to produce the neutral state in the automatic transmission, and therefore, a smooth acceleration from a standstill can be attained. In addition, the range of the ratio can be reduced by using the torque amplifying function of the torque converter, thereby making it possible to attempt to reduce the shock generated when shifting gears.

According to a third aspect of the invention, there is provided an automotive automatic transmission as set forth in the first or second aspect of the present invention, wherein the primary output shaft is made to be a hollow shaft so that the primary output shaft is disposed on an outer circumference of the input shaft in a concentric fashion, wherein the secondary output shaft is disposed in parallel with the primary output shaft, wherein the secondary transmission mechanism is constituted by a train of a plurality of gears provided between the primary output shaft and the secondary output shaft, and wherein a differential gear connecting to left and right wheels is allowed to connect to an axial end of the secondary output shaft which faces the engine.

The secondary transmission mechanism can be disposed between the engine connected to the input shaft and the primary transmission mechanism connected to the primary output shaft by disposing the output shaft which is made to be a hollow shaft on the outer circumference of the input shaft concentrically, and the differential gear can be disposed at the transversely central position of the vehicle by the secondary output shaft which is made shorter by allowing the differential gear to connect to the secondary output shaft which is in parallel with the primary output shaft at an end of the secondary output shaft which faces the engine.

BRIEF DESCRIPTION OF THE DRAWINGS

FIG. 2 is a table showing states of clutches for each gear of the automatic transmission according to the first embodiment of the present invention;

DETAILED DESCRIPTION OF THE PREFERRED EMBODIMENTS

Referring to FIGS. 1 to 4, a first embodiment according to the present invention will be described below.

Figure 1:
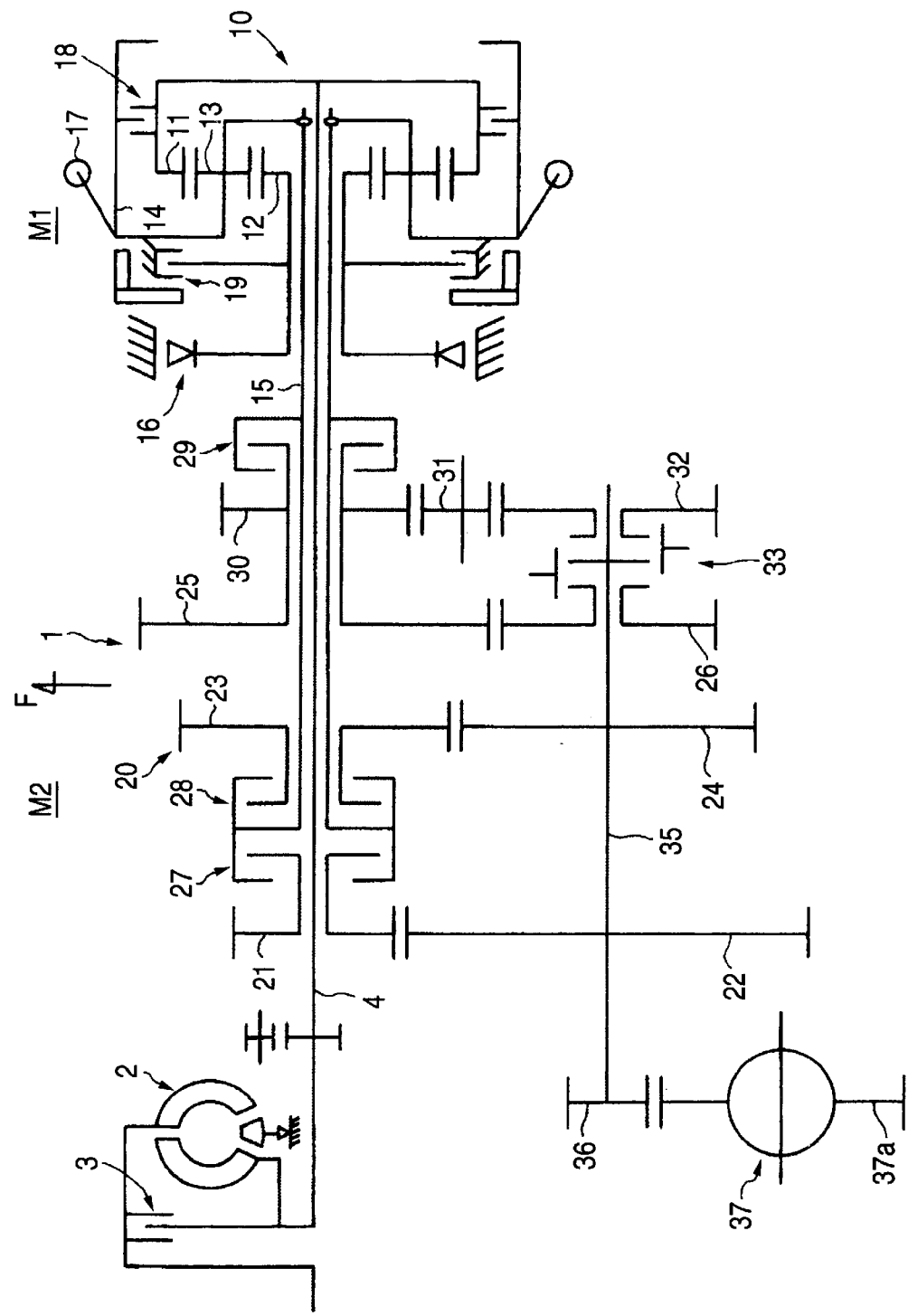
FIG. 1 is a schematic view showing the construction of an automatic transmission according to a first embodiment of the present invention.

FIG. 1 is a schematic view showing the construction of an automatic transmission 1 according to an embodiment of the invention designed for a Front-engine Front-drive or FF vehicle.

An internal combustion engine (not shown) is transversely mounted on a left-hand side of a front part of a body of the vehicle, and the output therefrom is transmitted to an input shaft 4 extending to the right via a torque converter 2 with a lockup clutch 3.

The input shaft 4 constituting a main shaft extends to the right over a certain length, and a planetary gear set 10 is provided at a right end of the input shaft 4 so extending.

The planetary gear set 10 includes a ring gear 11, a sun gear 12 and planetary gears 13 all of which are helical gears. The ring gear 11 is integrally connected to the input shaft 4 while a primary output shaft 15, which includes a hollow shaft and spline-fits in a carrier 14 for the planetary gears 13 for connection therewith, is concentrically disposed on an outer circumference of the input shaft 4 in such a manner as to extend toward the torque converter 2 which is situated to the left thereof, thus a double-shaft construction being provided by the input shaft 4 and the primary output shaft 15.

The sun gear 12 of the planetary gear set 10 is rotatably supported on the primary output shaft 15 and is connected to a stationary side via a one-way clutch 16. The sun gear 12 is also connected to a selector clutch 19 which can be fastened to the stationary side.

In the planetary gear set 10, a centrifugal clutch 18 adapted to be actuated by virtue of a centrifugal force produced by centrifugal weights 17 provided on the carrier 14 for the planetary gears 13 is disposed between the carrier 14 and the ring gear 11, thereby constituting a primary transmission M1.

Once the input shaft 4 starts to rotate, the ring gear 11 rotates integrally therewith, and the planetary gears 13 move around the sun gear 12 which is prevented from rotating in a certain direction by the one-way clutch 16 while rotating about their own axes, whereby the carrier 14 is allowed to rotate together with the primary output shaft 15.

In this planetary gear set 10, in a case where the centrifugal clutch 18 is in a released state, and the primary output shaft 15 rotates at a lower speed than the input shaft 4 (the revolution of the carrier 14 is slower than the rotation of the ring gear 11).

Namely, the speed ratio then (output speed/input speed) becomes smaller than 1.

In contrast, in a case where the centrifugal clutch 18 is in an applied state, the input shaft 4 and the carrier 14 are fastened together, whereby the rotation of the input shaft 4 is transmitted to the primary output shaft 15 at a speed ratio of 1 to 1.

In addition, a thrust force is produced on the ring gear 11 by virtue of centrifugal force produced in turn by the centrifugal weights 17 which rotate in conjunction with the revolution of the carrier 14 as the vehicle runs, whereas a thrust force is produced on the ring gear 11 via the meshed helical gears by a torque inputted to the ring gear 11 from the internal combustion engine via the input shaft 4, whereby the centrifugal clutch 18 is applied and/or released based on the both thrust forces.

The centrifugal clutch 18 is applied when the centrifugal force produced by the centrifugal weights 17 which rotate in conjunction with the revolution of the carrier 14 overpasses the torque inputted to the ring gear 11 from the internal combustion engine and on the contrary, the centrifugal clutch 18 is released when the torque overpasses the centrifugal force.

When trying to apply engine braking, with the centrifugal clutch 18 being in the applied state, because the input shaft 4 and the primary output shaft 15 rotate at the speed ratio of 1 to 1, engine braking can be applied effectively. On the contrary, in the event that the centrifugal clutch 18 is in the released state, since the one-way clutch 16 which connects to the sun gear 12 remains free, engine braking is tried to be applied by engaging the selector clutch 19 to secure the sun gear 12.

A secondary transmission M2 having a gear train 20 with parallel axes is provided between the primary transmission M1 and the torque converter 2.

In the secondary transmission M2, a secondary output shaft 35 is provided in parallel to the input shaft 4 and the primary output shaft 15 which are disposed coaxially, and arranged thereon in that order are a first low gear 21 supported on the input shaft 4 rotatably and slidably, a first intermediate gear 23 supported on the primary output shaft 15 rotatably and slidably and a first high gear 25. On the other hand, a second low gear 22 and a second intermediate gear 24 which are securely fitted on the secondary output shaft 35 and a second high gear 26 rotatably supported on the same shaft are made to mesh with the first low gear 21, the first intermediate gear 23 and the first high gear 25, respectively.

Then, provided on the primary output shaft 15 are a low range clutch 27 for the first low gear 21, an intermediate range clutch 28 for the first intermediate gear 23 and a high range clutch 29 for the first high gear 25.

In addition, a primary reverse gear 30 is provided integrally with the first high gear 25, and the primary reverse gear 30 meshes with an intermediate gear 31, which meshes in turn with a second reverse gear 32 supported rotatably on the secondary output shaft 35. A forward and reverse selector clutch 33 is provided on the secondary output shaft 35 for allowing the secondary output shaft 35 to selectively engage with the second reverse gear 32 and the second high gear 26.

The secondary output shaft 35 extends slightly more leftward than the second low gear 22 which is situated leftward thereon, and an input gear 37a of a differential gear mechanism 37 meshes with an output gear 36 disposed at an end of the secondary output shaft 35, whereby driving force is transmitted to front wheels via the differential gear mechanism 37.

In this automatic transmission 1, as has been described as above, the primary transmission M1 including the planetary gear set 10 and the centrifugal clutch 18 is provided at the right end of the input shaft 4 extending to the right from the internal combustion engine disposed on the left-hand side of the body of the FF vehicle via the torque converter 2, and the secondary transmission M2 including the gear train 20 with parallel axes and the three clutches 27, 28, 29 is provided between the primary transmission M1 disposed at the right end of the input shaft 4 and the torque converter 2, thus the secondary transmission M2 being situated at a slightly rightward central portion of the input shaft 4.

Thus, in the construction as has been described above in which the secondary transmission M2 is situated at the slightly rightward central portion of the input shaft 4, the output gear 36 is provided at the left end of the secondary output shaft 35 which is a shorter shaft protruding to the left in such a manner that the input gear 37a of the differential gear mechanism 37 is allowed to be brought into mesh engagement with the output gear 36. Accordingly, the output gear 36 can be made shorter and the differential gear mechanism 37 can be set at a most desirable substantially transeversly central position of the vehicle body, thereby making it possible not only to make the secondary output shaft 35 shorter but also to provide a well-balanced construction.

In the automatic transmission 1 as has been described above, six-speed gear shifting ranging from first to sixth speeds is configured by engaging the centrifugal clutch 18 of the primary transmission M1 and selectively engaging the three clutches 27, 28, 29 of the secondary transmission M2.

Namely, as shown in a table in FIG. 2, with only the low clutch 27 of the three clutches of the secondary transmission M2 being in an engaged state (applied) a first gear is established when the centrifugal clutch 18 of the primary transmission M1 is in a released state (low speed L with the speed ratio of less than 1), and a second gear is established when the centrifugal clutch 18 of the primary transmission M1 is in an engaged state (high speed H with the speed ratio of 1).

Similarly, with only the intermediate clutch 28 of the secondary transmission M2 being in an engaged state (applied), a third gear is established when the centrifugal clutch 18 of the primary transmission M1 is in a released state (low speed L), and a fourth gear is established when the centrifugal clutch 18 is in an engaged state (high speed H). Furthermore, with only the high clutch 29 of the secondary transmission M2 being in an engaged state (applied), a fifth gear is established when the centrifugal clutch 18 of the primary transmission M1 is in a released state (low speed L), and a six gear is established when the centrifugal clutch 18 is in an engaged state (high speed H).

Note that neutral is attained when all the three clutches 27, 28, 29 of the secondary transmission M2 are in the released state (disengaged).

In addition, when the forward and reverse selector clutch 33 is shifted to the reverse side and the high clutch 29 is applied, the secondary output shaft 35 rotates in a reverse direction, whereby the vehicle moves in the reverse direction.

Figures 3, 4:
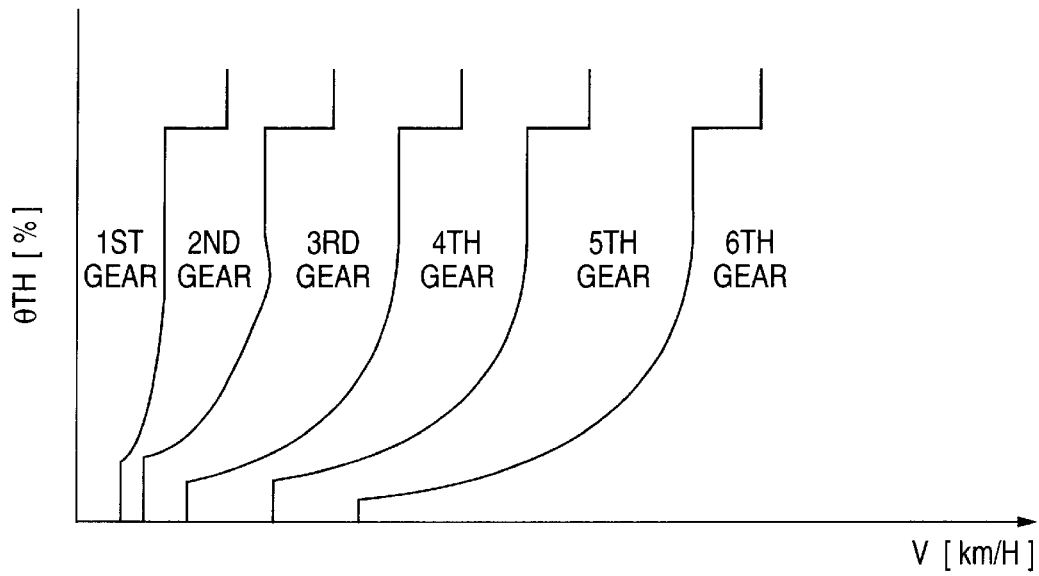
FIG. 3 is a V-θth map showing gear shift conditions between the engine speed V and the throttle valve opening θth.
FIG. 4 is a table showing the numbers of factors to be controlled in shifting the gears.

Shifting between the six gears is controlled by a 1:3 gear shift control means in accordance with a V-θth map of the engine speed V and the throttle opening θth shown in FIG. 3.

However, while the gear shift control means controls shifting between the second gear and the third gear, as well as between the fourth gear and the fifth gear which are related to the three clutches 27, 28, 29 of the secondary transmission M2 in accordance with the V-θth map which stores the inputted engine speed V and the throttle opening θth, the engagement and disengagement of the centrifugal clutch 18 of the primary transmission M1 when shifting, the gears is performed automatically.

Namely, shifting between the first gear and the second gear, between the third gear to the fourth gear and between the fifth gear and the sixth gear which are all related to the centrifugal clutch 18 of the primary transmission M1 is automatically implemented by setting in advance the weight of the centrifugal weights 17 and the relative thrust force of the helical gears in such a manner as to follow the V-θth map. When shifting is implemented between the second gear and the third gear and between the fourth gear and the fifth gear, the centrifugal clutch 18 is automatically engaged and disengaged in conjunction with the engagement and disengagement of the clutches 27, 28, 29 of the secondary transmission M2.

For example, in upshifting from the second gear to the third gear, when the low clutch 27 is controlled to be disengaged whereas the intermediate clutch 28 is controlled to be applied, the mesh engagement between the primary intermediate gear 23 and the second intermediate gear 24 becomes effective and the primary output shaft 15 rotates at low speeds, whereby the centrifugal clutch 18 is automatically changed from the engaged state (H) to the released state (L).

Thus, since the centrifugal clutch 18 of the primary transmission M1 is automatically actuated as the clutches 27, 28, 29 of the secondary transmission M2 are controlled to be engaged and released, a natural shift timing is realized to thereby obtain an extremely preferable drive feeling.

FIG. 4 shows a table in which the number of elements to be controlled simultaneously for gear shifting is compared between the prior art example described in JP-B-5-67831 and the automatic transmission according to the invention.

In upshifting from the first gear to the second gear (from the third gear to the fourth gear, from the fifth gear to the sixth gear), with the prior art example, there are two factors to be controlled; release of the sub-transmission from the low-speed state and engagement of the same into the high-speed state. In contrast, with the embodiment of the invention, there is no factor to be controlled as the primary transmission M1 is automatically shifted.

In addition, in upshifting from the second gear to the third gear (from the fourth gear to the fifth gear), with the prior art example, there are four factors to be controlled; release of the first gear of the primary transmission, engagement of the second gear of the same, release of the sub-transmission from the high-speed state and engagement of the sub-transmission into the low-speed state. In contrast, with the embodiment of the invention, there are only two factors to be controlled; release of the low clutch 27 of the secondary transmission M2 and engagement of the intermediate clutch 28 of the same transmission.

Consequently, with the automatic transmission according to the invention, there are few factors to be controlled in shifting the gears and the control system is simplified, thereby making it possible to reduce the production costs.

In addition, even in the event that the gears are downshifted from the fourth gear to the second gear through kickdown, when the change of the clutches 27, 28 of the secondary transmission M2 is controlled, the primary transmission M1 is designed to be automatically settled in the second gear state (high speed H), thereby making it possible to have a smooth downshift.

As has been described above, when all the clutches 27, 28, 29 of the secondary transmission M2 are put in the released state (disengaged) a neutral can be established, and therefore, since the torque converter 2 can be set with no additional specific mechanism such as a starter clutch, a smooth starting can be attained, and the range of the gear ratio can be made smaller by using a torque amplifying function of the torque converter 2, thereby making it possible to reduce shock generated in shifting the gears.

In the automatic transmission 1 according to the embodiment of the invention, the gear train 20 with parallel axes in the secondary transmission M2 may be constructed by at least a set of planetary gears, and when such a planetary gear set is used since no thrust force is generated, the secondary transmission M2 can be miniaturized.

Next, an automatic transmission 51 according to a second embodiment of the invention will be described with reference to FIG. 5.

This automatic transmission 51 is also designed for FF vehicles in which an internal combustion engine is installed transversely, and when compared with the automatic transmission 1 described previously the automatic transmission 51 differs from the automatic transmission 1 in that a primary transmission M1 and a secondary transmission M2 are disposed transeversly opposite positions to those in the automatic transmission 1, and the other features remain the same.

Consequently, the automatic transmission 51 will be described by imparting like reference numerals to like members.

Output from an internal combustion engine (not shown) disposed to the left of the automatic transmission 51 is transmitted to an input shaft 52 which extends to the right via a torque converter 2. The input shaft 52 is not as long as the input shaft 4 and integrally connected to a ring gear 11 of a planetary gear set 10 of a primary transmission M1 disposed adjacent to the torque converter 2.

The primary output shaft 53 connected to a carrier 14 for planetary gears 13 of the planetary gear set 10 extends coaxially with the input shaft 52 to the right further, and a gear train 20 with parallel axes of the secondary transmission M2 is configured between the primary output shaft 53 and a secondary output shaft 54 which is parallel with the primary output shaft 53.

The secondary output shaft 54 extends to the left and power is transmitted to a differential gear mechanism 37 via an output gear 36.

Since the internal combustion engine, the primary transmission M1 and the secondary transmission M2 are disposed from the left to the right in that order, the input shaft 52 and the primary output shaft 53 do not have to be formed into a double-shaft construction, whereby a simplified shaft construction can be provided.

Figure 5:
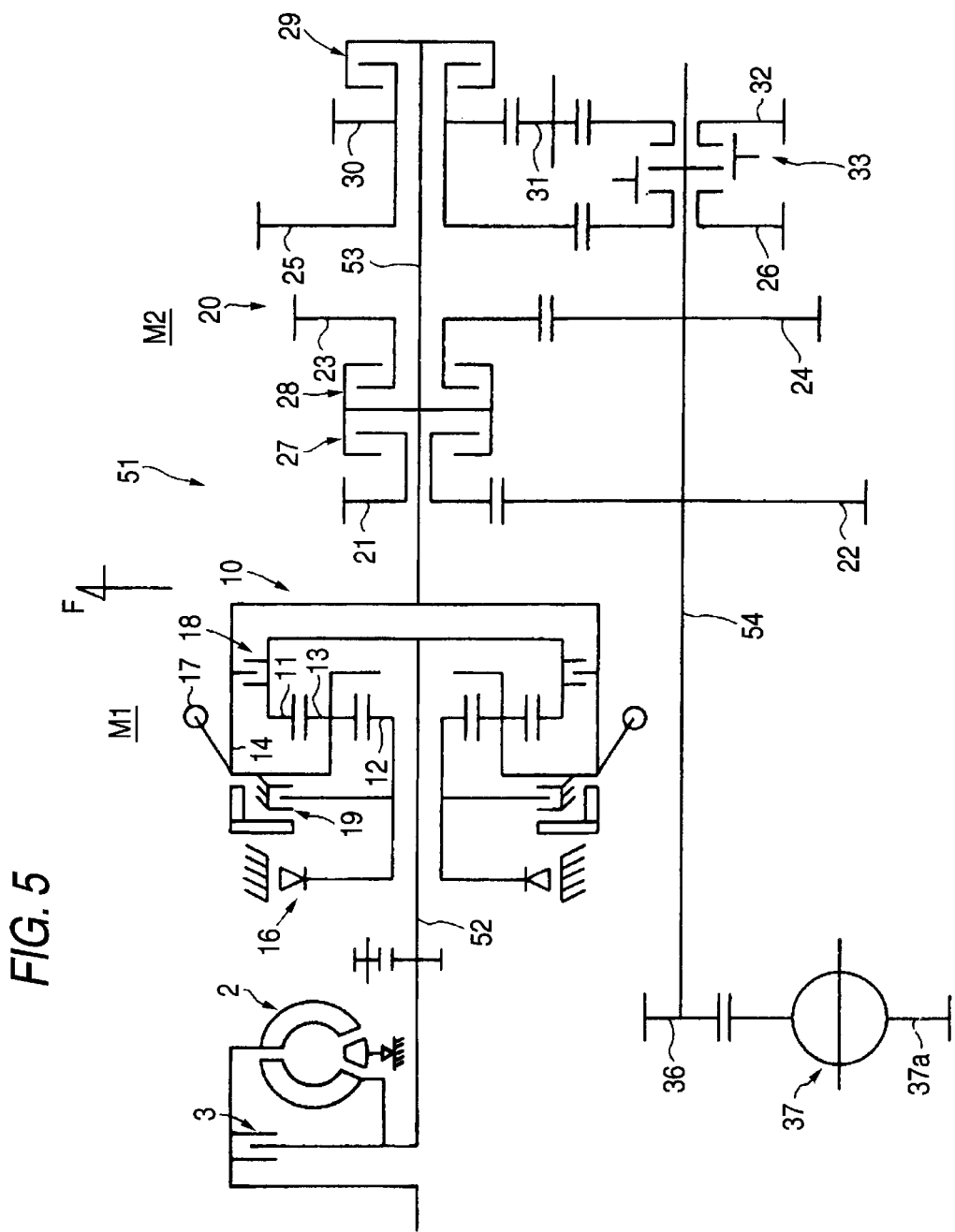
FIG. 5 is a schematic view of the construction of an automatic transmission according to a second embodiment of the present invention.

However, in the event that the differential gear mechanism 37 is disposed transversely centrally of the vehicle body, the secondary output shaft 54 becomes long as shown in FIG. 5.

The basic construction of a control system is identical to that of the automatic transmission 1, and there are few factors to be controlled in shifting gears, whereby the control system can be simplified to thereby reduce the production costs.

In this automatic transmission 51, the gear train 20 with parallel axes of the secondary transmission M2 may be constructed by at least a set of planetary gears in an attempt to miniaturize the secondary transmission M2.

This construction may be applied to a Front-engine, Rear-drive vehicle or FR vehicle in which the internal combustion engine, the primary transmission M1 and the secondary transmission M2 are disposed in that order.

Figure 6:
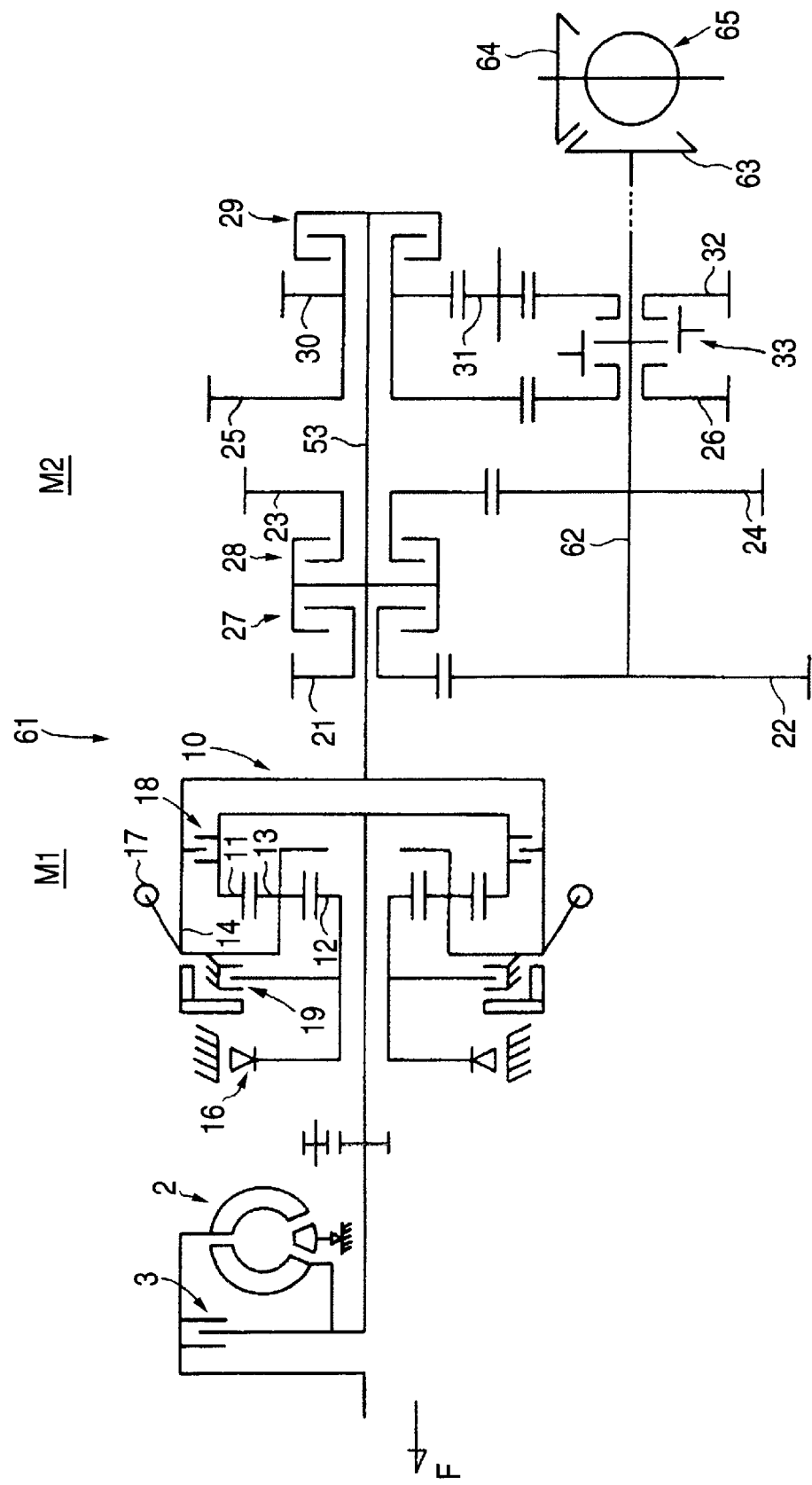
FIG. 6 is a modification to the automatic transmission shown in FIG. 5.

Namely, as shown in FIG. 6, an internal combustion engine is longitudinally installed at a front part of the vehicle body and an automatic transmission 61 which is a modification to the automatic transmission of the invention which has just been described is disposed to the rear of the internal combustion engine such that a primary transmission M1 and a secondary transmission M2 are disposed in that order.

Then, a secondary output shaft 62 is made to extend to the rear, not to the front, and a differential gear mechanism 65 can be disposed at a rear end thereof via bevel gears 63, 64, whereby the differential gear mechanism 65 can easily be disposed at a rear part of the vehicle body, thus the automatic transmission 61 being provided which has a suitable layout of the primary and secondary transmissions to the FR vehicle in which the internal combustion engine is installed in the front part of the vehicle and rear wheels function as drive wheels.

Figure 7:
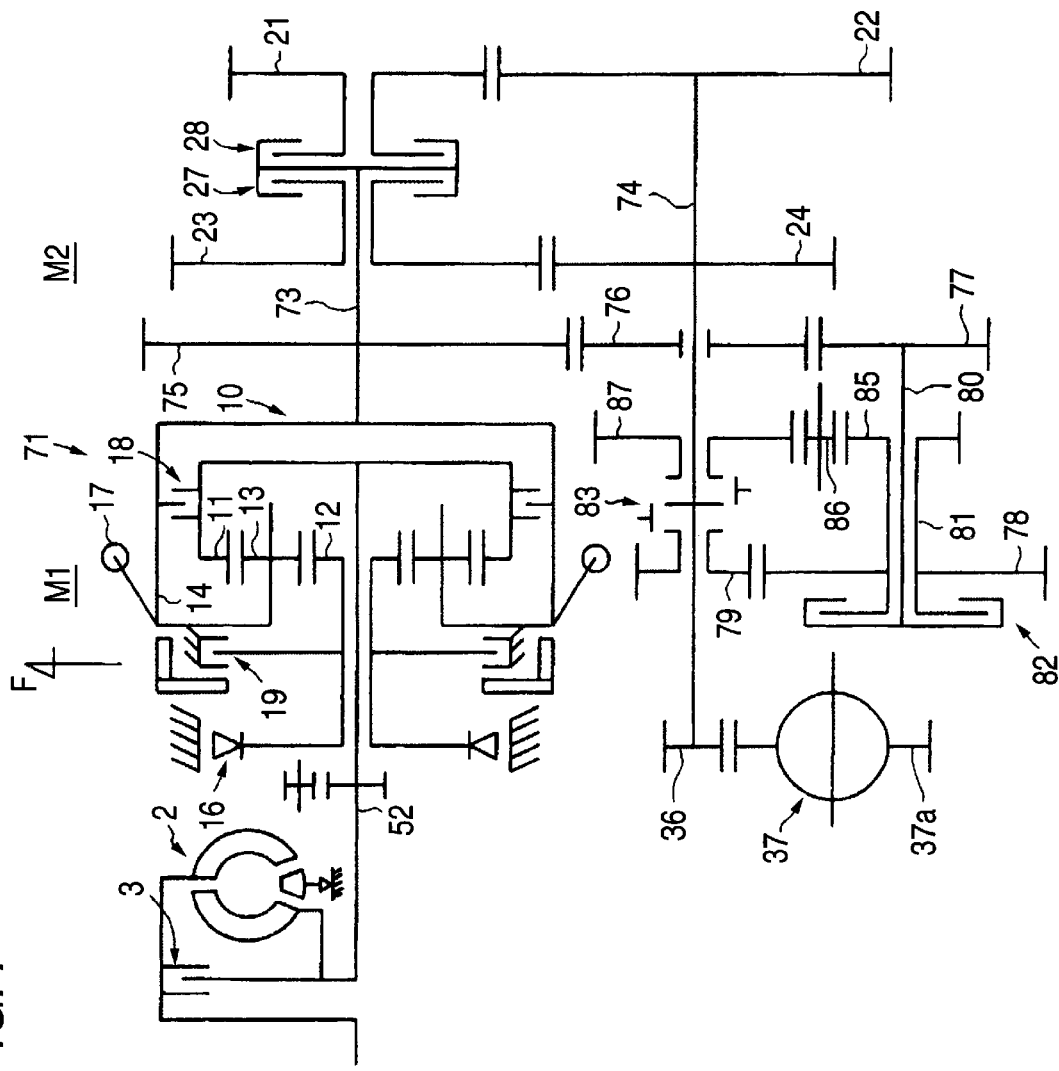
FIG. 7 is a schematic view of the construction of a third embodiment of the present invention.

Next, an automatic transmission 71 according to a third embodiment of the invention will be described with reference to FIG. 7.

Similarly to the automatic transmission 51, this automatic transmission 71 is designed for FF vehicles in which an internal combustion engine is installed transversely on the left-hand side of a front part of a body of the vehicle and is constructed such that the internal combustion engine, a primary transmission and a secondary transmission are disposed in that order from the left to the right when the automatic transmission 71 is installed adjacent to the internal combustion engine. However, part of the secondary transmission M2 is constructed to be provided on a secondary output shaft side.

Like reference numerals are imparted to like members.

A secondary transmission M2 is formed between a primary output shaft 73 connected to a carrier 14 for planetary gears 13 of a primary transmission M1 and a secondary output shaft 74 which is parallel with the primary output shaft 73, and a group of low gears 21, 22, a group of intermediate gears 23, 24 and low and intermediate clutches 27, 28 are substantially identical to those of the automatic transmission 51 described previously, but a group of high gears and a high clutch are constructed differently.

Namely, a first high gear 75 is integrally connected to the primary output shaft 73, the first high gear 75 meshes with a second high gear 76 rotatably supported on the secondary output shaft 74, and the second high gear 76 meshes with a third high gear 77 which is made integral with a primary intermediate shaft 80.

A secondary intermediate shaft 81 which is a hollow shaft is rotatably supported on the primary intermediate shaft 80 in a concentric fashion, and a fourth high gear 78 which is made integral with the secondary intermediate shaft 81 meshes with a fifth high gear 79 rotatably supported on the secondary output shaft 74.

The high clutch 82 provided at an end of both the primary intermediate shaft 80 and the secondary intermediate shaft 81 performs engagement and release of both the primary and secondary intermediate shafts 80, 81, and a selector clutch 83 performs engagement and release of the fifth high gear 79 and the secondary output shaft 74.

A first reverse gear 85 is integrally provided on the secondary intermediate shaft 81, and the first reverse gear 85 meshes with an intermediate gear 86, the intermediate gear 86 meshes with a second reverse gear 87 rotatably supported on the secondary output shaft 74, and the selector clutch 83 performs engagement and release of the second reverse gear 87 and the secondary output shaft 74, whereby a reverse mechanism is constructed.

The automatic transmission 71 according the embodiment of the invention is constructed as has been described above, and since part of the group of high gears 76, 77, 78, 79 and the reverse mechanism are moved to a secondary output shaft 74 side, the transverse width of the automatic transmission 71 can be reduced in general.

Note that the basic construction of a control system is identical to those of the previously described embodiments, and there are few factors to be controlled in shifting the gears, whereby the control system can be simplified and the production cost is attempted to be reduced.

While only certain embodiments of the invention have been specifically described herein, it will apparent that numerous modification may be made thereto without departing from the scope of the invention.

What is claimed is:

1. An automotive automatic transmission comprising:
    a primary transmission mechanism including:
        an input shaft connected to an engine;
        a planetary gear set having a sun gear, planetary gears and a ring gear, each of which is a helical gear, wherein one of said sun gear and said ring gear is connected to said input shaft and the other is connected to a stationary member via a one-way clutch and wherein a carrier for said planetary gears is connected to a primary output shaft; and
        a centrifugal clutch adapted to engage and release said input shaft with and from said primary output shaft in correspondence with a centrifugal force by a weight and a thrust force by said helical gear, wherein said primary transmission mechanism contains no more than one said centrifugal clutch;
    a secondary transmission mechanism connected to said primary output shaft of said primary transmission, for controlling a gear-shift into two or more speed-changed conditions; and
    a gear shift controlling unit establishing a multiplicity of change-speed gears by selectively combining a released state and an engaged state of said centrifugal clutch of said primary transmission mechanism for each of said speed-changed conditions of said secondary transmission mechanism.

2. The automotive automatic transmission as set forth in claim 1, further comprising:
    a torque converter provided between said engine and said input shaft,
    wherein said gear shift controlling unit cuts off the transmission of power in said secondary transmission mechanism to establish a neutral condition of said automatic transmission.

3. The automotive automatic transmission as set forth in claim 1, wherein said primary output shaft is formed to be a hollow shaft such that said primary output shaft is concentrically disposed on an outer circumference of said input shaft,
    wherein a secondary output shaft is disposed in parallel with said primary output shaft, wherein said secondary transmission mechanism comprises a train of a plurality of gears provided between said primary output shaft and said secondary output shaft, and
    wherein a differential gear connecting to left and right wheels is connected to an engine-side end of said secondary output shaft in an axial direction of said secondary output shaft.

4. The automotive automatic transmission as set forth in claim 1, wherein said centrifugal clutch is adapted to engage said input shaft with said primary output shaft in correspondence with said centrifugal force by said weight and to release said input shaft from said primary output shaft through the thrust force by said helical gear.

5. The automotive automatic transmission as set forth in claim 1, wherein said centrifugal clutch is disposed between said carrier for said planetary gears and the one of said sun gear and said ring gear connected to said input shaft.

6. The automotive automatic transmission as set forth in claim 5, wherein said weight of said centrifugal clutch is disposed on said carrier for said planetary gears.

7. The automotive automatic transmission as set forth in claim 5, wherein said carrier for said planetary gears having said centrifugal clutch is spline-engaged with said primary output shaft.

* * * * *

UNITED STATES PATENT AND TRADEMARK OFFICE
CERTIFICATE OF CORRECTION

PATENT NO.    : 6,733,412 B2
DATED         : May 11, 2004
INVENTOR(S)   : Kumagai et al.

It is certified that error appears in the above-identified patent and that said Letters Patent is hereby corrected as shown below:

<u>Title page,</u>
Item [30], Foreign Application Priority Data, change
"May 21, 2001 (JP) ..........P. 2000-151287" to be
-- May 21, 2001 (JP) ..........P. 2001-151287 --

Signed and Sealed this

Twenty-fourth Day of August, 2004

JON W. DUDAS
*Director of the United States Patent and Trademark Office*